Fig. 4.

H. M. SWEET.
POWER PLOW.
APPLICATION FILED NOV. 5, 1914.

1,230,339.

Patented June 19, 1917.
7 SHEETS—SHEET 4.

WITNESSES:
Richard Alspas.
Emens B. Wisner

INVENTOR.
Howard M. Sweet
BY
Charles E. Wisner
ATTORNEY.

H. M. SWEET.
POWER PLOW.
APPLICATION FILED NOV. 5, 1914.

1,230,339.

Patented June 19, 1917.
7 SHEETS—SHEET 7.

WITNESSES:

INVENTOR.
Howard M. Sweet
BY
Charles E. Wisner
ATTORNEY.

UNITED STATES PATENT OFFICE.

HOWARD M. SWEET, OF DETROIT, MICHIGAN, ASSIGNOR, BY MESNE ASSIGNMENTS, TO A. T. HARROW TRACTOR COMPANY, A CORPORATION OF MICHIGAN.

POWER-PLOW.

1,230,339.     Specification of Letters Patent.     Patented June 19, 1917.

Application filed November 5, 1914. Serial No. 870,361.

*To all whom it may concern:*

Be it known that I, HOWARD M. SWEET, a citizen of the United States, residing at Detroit, county of Wayne, State of Michigan, have invented a certain new and useful Improvement in Power-Plows, and declare the following to be a full, clear, and exact description of the same, such as will enable others skilled in the art to which it pertains to make and use the same, reference being had to the accompanying drawings, which form a part of this specification.

This invention relates to power operated gang plows and its object is a self-propelled power apparatus provided with a series of plows adapted to be handled by application of the said power. A further object is a power plow in which the power of the apparatus may be applied to handle the plows collectively as occasion may demand and having means for handling the plows individually. A further object resides in the means whereby the gang of plows may be set to plow at equal depth when one side of the apparatus is lower than on the other. Another object of the invention resides in the arrangement of the various levers through operation of which the plows may be manipulated to such relation as to be within the control of a single operator. These and other objects and the various novel features of construction by which they may be attained are hereinafter more fully described and claimed and shown in the accompanying drawings in which—

Fig. 13 is a front elevation of the steering wheel.

Similar characters refer to similar parts throughout the drawings and specification.

Figure 2:
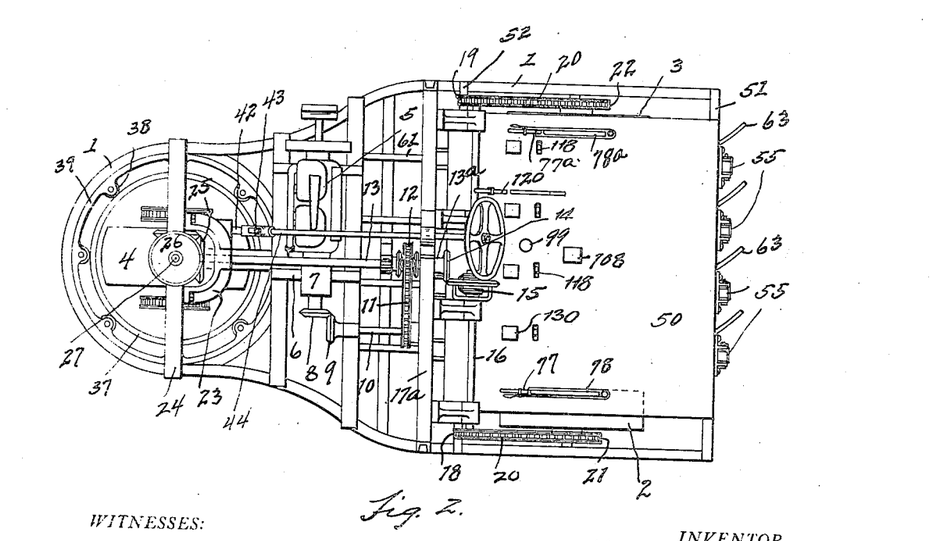
Fig. 2 is a plan view thereof.

The framework 1 of the apparatus is supported at the rear by a pair of wheels 2 and 3 and at the front by a single steering wheel 4. A power plant 5 is mounted on a framework 6 carried on the main frame 1. The power plant is preferably of the internal combustion engine type provided with a speed changing power transmission device of any approved form carried in a casing indicated at 7 in Fig. 2. The power shaft projects from said case and is provided with a bevel gear 8 meshing with a similar gear 9 on a counter-shaft 10 carried in bearings provided in the framework. The shaft 10 is provided with a sprocket wheel connected by a chain 11 with another sprocket wheel 12 on the shaft 13. The shaft 13 is divided into two parts 13 and 13ª, between the ends of which the sprocket wheel 12 is located. The sprocket wheel 12 provides the driving member of a differential gear group of common form, the companion driven members of which are secured on the two adjacent ends of the shafts 13 and 13ª. The shaft 13ª is provided with a gear 14 providing a driving gear for a differential gear group 15 interposed in the jack-shaft 16 carried in brackets secured to a horizontal member 17ª of the vertical framework 17. The jack-shaft is provided with sprockets 18 and 19 upon opposite ends thereof, each provided with similar sprocket chains 20 for driving the sprockets 21 and 22 attached to the driving wheels 2 and 3 respectively. The differential gear group 15 allows the wheels 2 and 3 to have a differential movement.

The forward end of the shaft 13 is carried by a U shaped bracket 23 secured to the upper end of an inverted U shaped yoke 24, the depending ends of which are carried on the frame 1. At the forward end the shaft 13 is provided with a bevel gear 25 meshing with a similar gear 26 on a vertical shaft 27 carried in the inverted U shaped member 24.

As is shown in Fig. 13, the vertical shaft 27 extends through a bearing in a second U shaped yoke member 28 carrying a shaft 29 at the bottom ends thereof on which the steering wheel 4 is rotatably mounted. On the shaft 27 is a bevel gear 30 meshing with a similar gear 31 on the horizontal shaft 32 mounted in bearings in the upper part of the yoke member 28. This shaft is provided with a pair of sprocket wheels 33 and 34 connected by sprocket chains to sprocket wheels 35 and 36 on the driving wheel shaft 29. Thus rotation of the shaft 13 drives the wheel 4 and by use of the sprocket differential 12 the wheel 4 may have a differential movement relative to the wheels 2 and 3.

Figure 1:
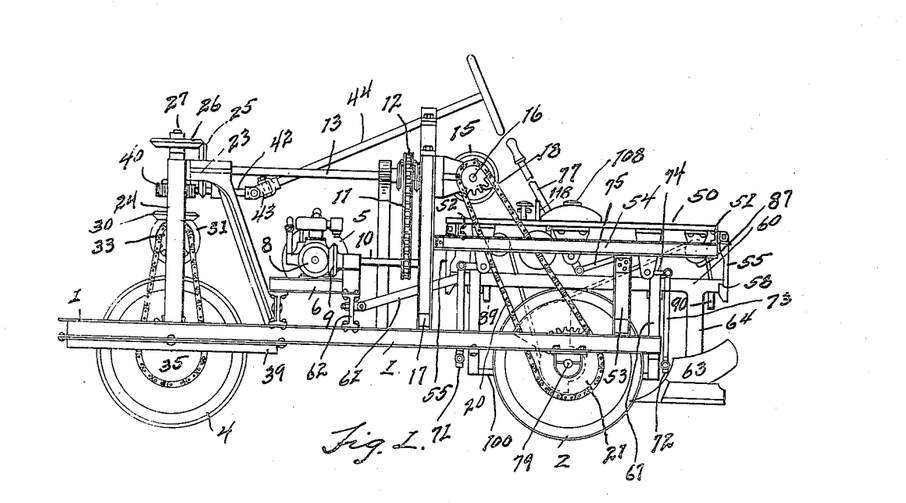
Figure 1 is a side elevation of a power plow embodying my invention.

Secured to the lower end of the inner yoke member is a ring 37 providing a bearing surface for a series of rollers 38 pivotally mounted in the channeled ring member 39 supported by the main frame. By this arrangement the shaft 27 is relieved of strain that would otherwise be imposed thereon by inequalities in the road surface. The yoke and ring member 37 attached thereto and the steering wheel 4 may be turned by the worm wheel 40 secured to a hub with which the yoke member is provided. The worm wheel is turned through operation of the worm 41 on the horizontal shaft 42 connected by a universal joint 43 with the steering wheel shaft 44 as shown in Fig. 1.

The above described apparatus constitutes the power device and the application of the power to propelling the wheels, and the following description relates to the plows, the mechanism for manipulating the plows, and the application of the power, as well as the levers and other parts utilized, in manipulation of the plows. At the rear of the device and directly over the rear driving wheels is the operator's platform 50 supported on the steel beams 51 and 52 which are carried by the uprights 17 and 53 and a longitudinal beam 54 on each side of the platform. The vertical frame members 17 and 53 are supported on the main frame 1.

Figure 5:
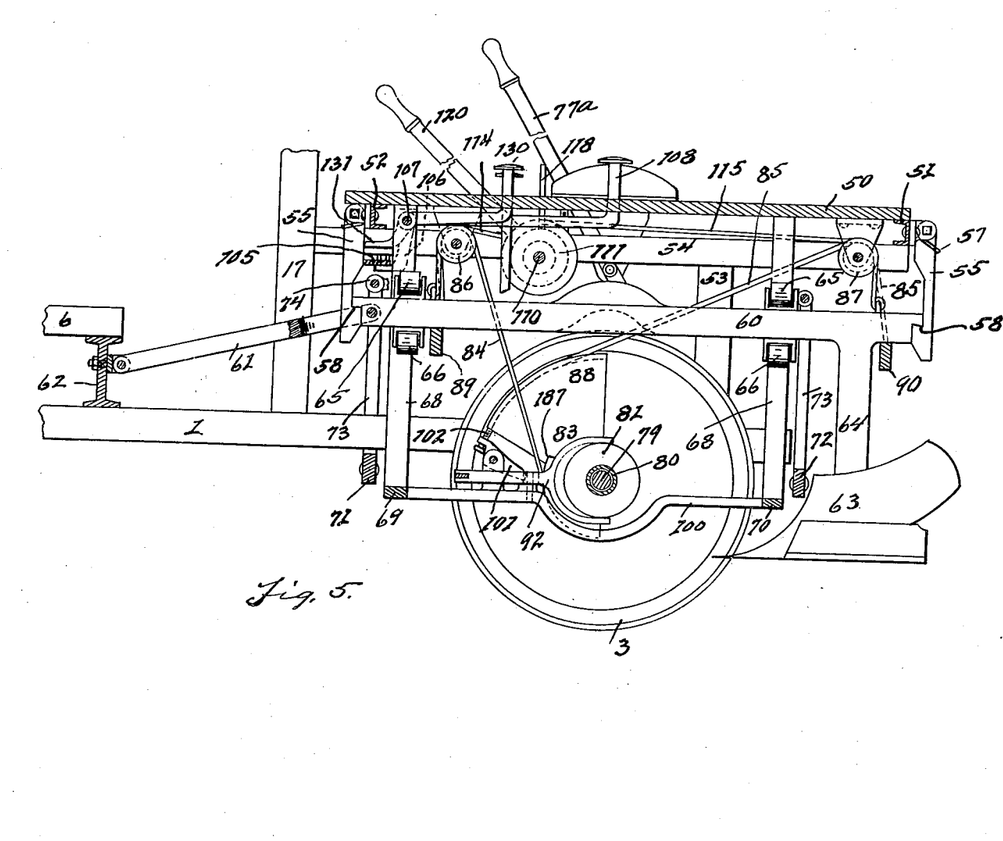
Fig. 5 is a vertical section taken on line *x—x* of Fig. 3.

To each of the cross beams 51 and 52 is pivotally secured a series of four latch members 55 each of which is provided with a small spring 57 having one end coiled about the pivot pin and tending to force the said latch members inward toward the main drive shaft in each instance. Each of these latch members is provided with a notch 58 adapted to be engaged by a notched end provided at both the front and rear of the horizontal plow beam 60 as shown in Fig. 5. There are four of these plow beams and each is independently held by the corresponding latch members 55 and all of the plow beams are held by the latch members when the plow is out of operation and withdrawn from the ground. To the forward end of each plow beam is pivoted the forked end of a draw bar 61 the opposite end being pivotally mounted at its forward end and secured to a cross beam 62 of the engine frame. The plow 63 in each instance is of the ordinary type mounted on the depending arm 64 of each horizontal plow beam 60 shown as formed integrally therewith but may be bolted thereto if desired. The draw bar 61 takes the entire strain of drawing the plows through the ground.

Figure 3:
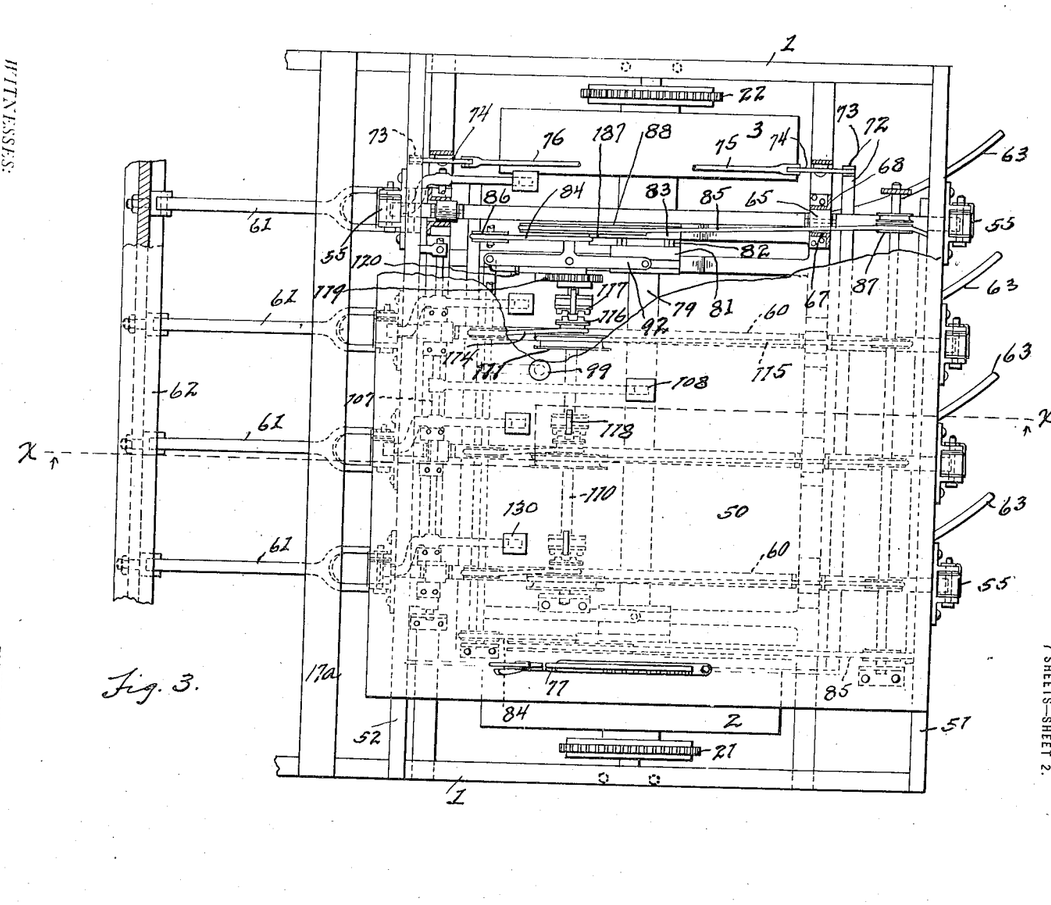
Fig. 3 is a plan view of the plow end of the device on an enlarged scale showing the operator's platform partly broken away to disclose parts of the plow operating mechanism.

As hereinafter shown each of the plow beams and attached plow is adapted to be raised or lowered and to guide the beam in its upward movement each beam is provided with a pair of rollers 65 and 66 upon the upper and lower side thereof both near the forward and the rear end. These rollers are somewhat greater in diameter than the width of the beam and each pair rides between a pair of uprights 67 and 68 carried between the platform 50 and the members 69 and 70 of the subframe 100, as shown more clearly in Figs. 3, 5 and 6, the said parts having been left out of Fig. 4, to avoid confusion. These vertical guide bars, and the rollers mounted on the beam, not only hold the plow from being twisted sidewise by obstructions encountered in plowing but serve to guide the ends of the beams when being raised to engagement by the latch members 55. These vertical guide members 67 and 68 are of such length that the plow beam and the rollers thereon are always held between the guide bars when the plow is in its lowermost plowing position.

Figure 4:
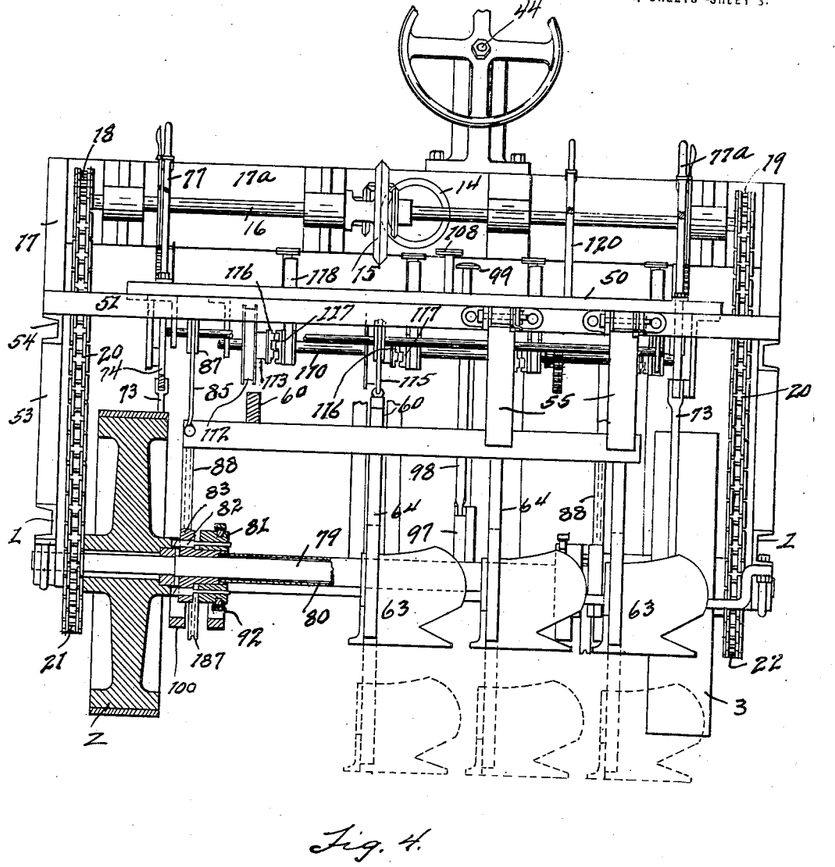
Fig. 4 is a rear elevation partly in section of the device.
Figures 5, 6:
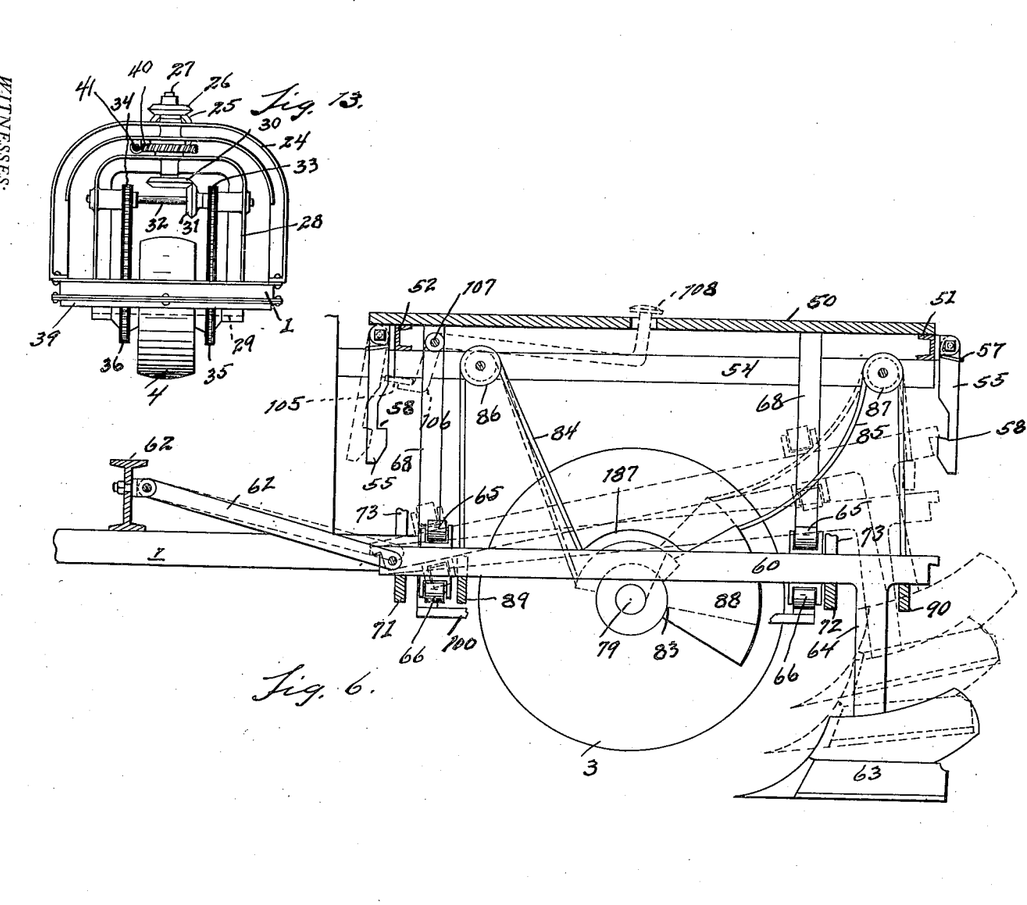
Fig. 6 is a similar section showing only those parts utilized in handling the plows and illustrating the method of starting the plow into the ground.
Figure 7:
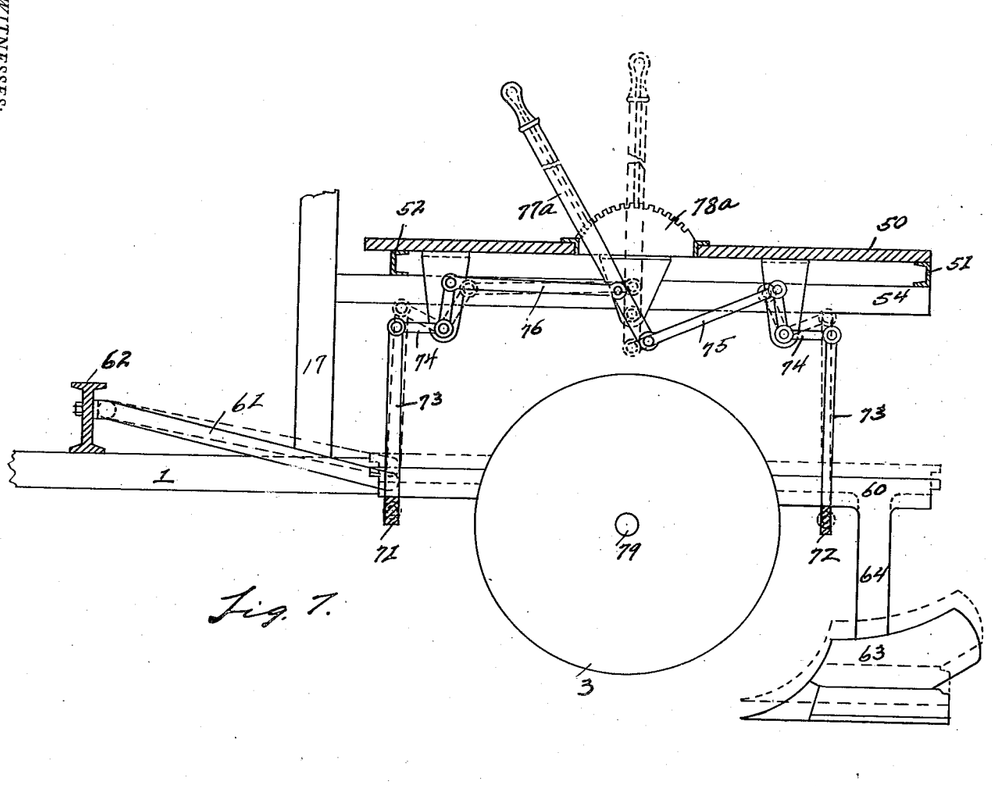
Fig. 7 is a similar section showing the means employed to vary the depth to which the plows may operate.

When in the plowing position each of the plow beams rests on cross-members 71 and 72 shown in Figs. 5, 6 and 7. Each end of each of these cross-beams is provided with a link 73, 73, pivoted to the cross-member 71 or 72 and pivoted at its upper end to a bell crank 74, the opposite end of which bell crank is pivoted to a link 75 and 76 respectively, which are in turn pivoted to an operating lever 77 at equidistant points from its pivoted point. There are two sets of bell cranks, connecting levers and operating levers, therefor, one at each side of the platform the operating levers being shown at 77 and 77$^a$ in Figs. 2 and 4. One set of levers and cranks operating one end of the beams 71 and 72, and the other set operating the opposite ends of the said beams. The levers 77 and 77$^a$ are each provided with a spring controlled latch member or dog adapted for engagement with the tooth segment 78 or 78ᵃ, whereby the said levers may be held in their set position and thus limit the depth to which the plows enter the ground. By this arrangement also the gang of plows may be set lower on one side than on the other, which is of use if one of the wheels 2 or 3 rides in a furrow, in which case it is necessary that the plow on the low side be raised so as not to plow too deeply. It is also to be noted that although Fig. 7 shows the arrangement of the levers for controlling the depth to which the plows are operated, other parts are left out of said view to avoid confusion, and also that the said bell cranks and operating levers 77 and 77ᵃ are only utilized to regulate the depth at which the plow operates and are not utilized to raise the plows out of the ground which operation is performed by the following described apparatus.

As may be seen in Fig. 4, the drive wheels 2 and 3 are both mounted to rotate on the shaft 79, the driving sprockets 21 and 22 for the wheels being directly attached to the hubs thereof. On the shaft between the hubs is a tube 80 carrying near each end a sliding clutch member 81 each of which carries a series of pawls 82 having beveled ends riding in apertures in the hub of the differential lifting segments 83, which are secured to the tube 80. The contiguous faces of each of the hubs of the driving wheels are provided with notches for engagement by the pawls 82 and, by sliding the member 81 on the tube, the pawls 82 are made to enter the notches in the wheel hub, thus driving the differential segments 83 at such time. As both the lifting segments 83 are attached to the tube 80 they are made to operate in unison even though the driving wheels have different speeds. Each of the segments 83 has secured thereto a cable 84 and a cable 85 running over pulleys 86 and 87 respectively carried at the front and rear of the platform frame as shown more particularly in Fig. 6. Each of the segments is provided with a segmental groove 187 of short radius adapted to receive the cable 84 and a similar segmental groove 88 of greater radius adapted to receive the cable 85. The two cables 84 on opposite sides of the machine are secured to opposite ends of the cross-bar 89 and the two cables 85 are similarly secured to the ends of a cross-bar 90, both cross bars running beneath the plow beams, and, when the clutch member 81 is moved to throw the pawls 82 into engagement with the corresponding notches in the hubs of the driving wheels, the segments 83 are rotated which begin to wind up the cables, raising the cross-bars 89 and 90 and lifting the plows from the ground. It is to be noted that when the plows are down and operating, as is indicated in Fig. 6, the cable 84 is practically taut while the cable 85 has considerable slack. Therefore, when the segments 83 begin to rotate, the cable 84 is first put under strain and begins to lift the cross-bar 89 raising the points of the plows so that they will naturally draw out of the ground. As the segments 83 continue to rotate, the cable 85 is next put under strain and begins to raise the rear ends of the plow beams 60, and, as it is wound on a greater radius than the cable 84, the rear ends of the plow beams are raised more rapidly than the front end so that by the time the front ends of the plow beams have been raised to engage the notch in the latch members 55 at the front end of the platform the rear ends of the beams are brought to the same position and relation with the latch members at the rear end of the platform. As is hereinafter shown the clutch member 81 is automatically operated to withdraw the pawls 82 from engagement with the notches in the hubs of the wheels at the time the plow beams rest in the supporting latch members 55. As soon as the pawls 82 are released the weight of the cross-bars return the segments to their original position for successive operations.

Figure 8:
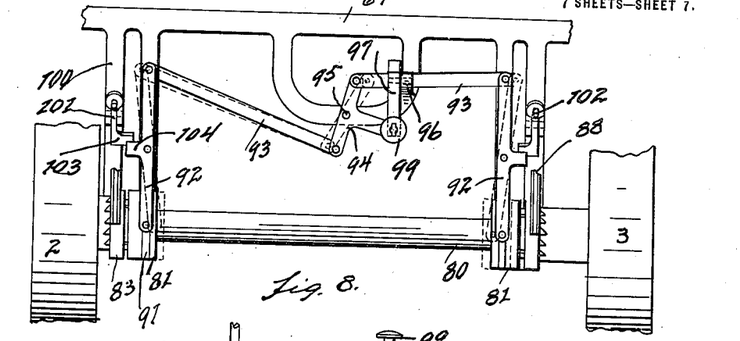
Fig. 8 is a plan view of the clutches and operating levers by means of which the power of the device may be applied in manipulation of the plows.
Figures 9, 10:
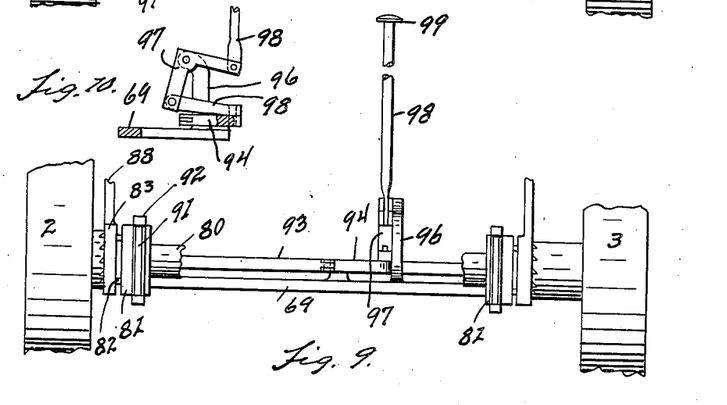
Fig. 9 is a rear elevation of the parts shown in Fig. 8.
Fig. 10 is a detail of part of the control levers shown in Fig. 8.

As may be seen in Figs. 8, 9 and 10, the clutch members are provided with a circumferential groove in which rides a split ring 91 pinned to the forked end of the companion pivoted levers 92 on opposite sides of the machine. The opposite ends of each of these levers are connected by links 93 to opposite ends of the pivoted T lever 94. By turning this lever 94 on its pivot point 95, the clutch members 81 may be simultaneously moved to bring the pawls 82 into or out of engagement with the notched hubs of the driving wheels. The T lever 94 is mounted on part of the cross frame 69. This frame is provided with a standard 96 as may be seen in Fig. 10, on which is pivotally mounted a bell crank 97 having a link 98 pivoted to the end of one of the arms of the T crank. To the opposite end of the bell crank is connected a rod 98 extending upward through the platform and terminating in a head 99. By the operator stepping on this head 99 the bell crank is depressed and made to swing the T crank on its pivot and throw the clutches into operation which winds up the cords 84 and 85 in the manner described.

On the frame 100 extending between the cross-frames 69 and 70 is pivotally mounted a releasing dog 101 having an adjusting screw 102 near one end which is engaged by part of the lifting segment 83 when the plow beams are raised as shown in Fig. 5. As may be seen in Fig. 8, the releasing dog 101 has a foot 103, which lies in the proper plane to engage a lug 104 on the clutch operating lever 92. There are two releasing dogs, one on each side of the machine and when the dogs are engaged by the segments as shown in Fig. 5, actuation thereof by the segments trips both the levers 92 and releases the segments 83 from operation. By means of the adjustable stop 102 this may be timed to occur when the plow beams have been engaged by the supporting latch members.

As before stated there is a latch member 55 for each plow beam at both the forward and rear ends and, as may be seen in Fig. 5, a bar 105 extends across the machine behind each of the front latch members 55. To this bar are secured arms 106 preferably at each end of the bar which are fastened to a shaft 107 and to this shaft is secured a foot lever 108. By stepping on this lever the latch members 55 holding the front end of the plow beams are pushed outward as indicated by dotted lines in Fig. 6, which allows the front ends of the beams to fall as indicated by dotted lines in the said figure. As the front ends of the beams reach their lowermost position on the cross-bar 71, the rear ends of the beams draw out of their respective notches in the rear latch members 55 allowing the back ends of the beams to fall. The dotted lines in the said Fig. 6 indicate two positions of the plows and the beams and indicating that the plows enter the ground on an angle whereby it finally draws to the position shown by full lines in the figure and enter the ground to a depth permitted by the limiting beams 71 and 72. It is thus to be seen that the plows are started into the ground point first and that in raising them from the ground, as heretofore described, the point is raised first which is the usual method of handling a plow by hand. It is also to be noted that, even though the plow beams 60 lie at an angle during the time they are being dropped to plowing position, nevertheless the rollers 65 and 66 are at all times between the vertical guide beams 67 and 68, the rollers being of such length as not to draw out from between the said beams.

Figures 11, 12:
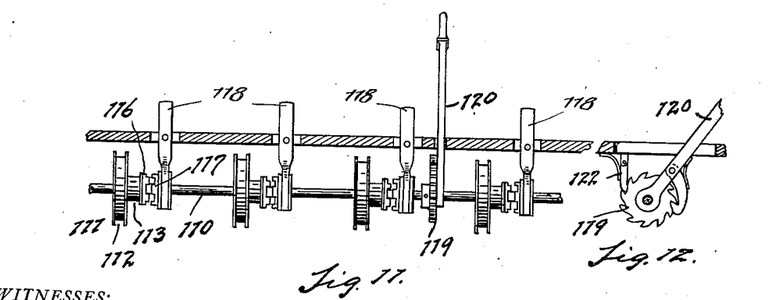
Fig. 11 is a detail of the means utilized in manipulating either of the plows singly.
Fig. 12 is a detail of the operating lever and ratchet utilized in manipulation of the plows singly.

As before stated the entire gang of plows are raised as a unit by the cross-beams 89 and 90 but, as it often happens that a single plow or less than the entire number of plows need to be raised, particularly to avoid an obstruction in front of one or more of the plows, or in completing a dead furrow when only one or two of the plows may be required for use, means are provided whereby the plows may be raised individually. To accomplish this, I have provided a shaft 110 supported on the framework beneath the platform, and have provided a series of double pulleys 111 for each plow beam having a cable groove 112 of large diameter and a groove 113 of small diameter. Secured to and adapted to be wound in the groove of small diameter is a cable 114 attached directly to the plow beam near its forward end as shown in Fig. 5. A similar cable 115 is secured to near the rear end of the plow beam and adapted to be wound in the groove of large diameter. Each of these double pulleys is loose on the shaft and has one end of the hub notched at 116 to receive the similarly notched face of a sliding clutch member 117 individual to each pulley. The clutch member 117 is keyed to the shaft and slidable thereon by operation of the pivoted, forked, operating lever 118 having a short end projecting upward through the platform 50, so that the operator may throw any one of the clutches into engagement with its companion member on the double pulley. Also fixedly secured to the shaft is a ratchet wheel 119. Pivoted on the shaft is an operating lever 120 having a pawl 121 engaging the ratchet wheel, the lever 120 extending through a slot in the platform and, by turning the lever from a forward to a rearward position, the shaft is rotated which rotates any pulley 111 that is engaged by its companion clutch 117. Rotation of this pulley first raises the front end of the plow beam as the cable 114 attached to the said front end is taut when the plow beams are down and the cable 115 is slack at such time. Therefore, the front end of the beam is first raised, as in the gang operation heretofore described, lifting the point of the plow so that it will draw out of the ground by which time the cable 115 becomes taut raising the back end of the beam more rapidly by reason of its being wound on the wheel of greater diameter. As shown in Fig. 12, a spring controlled pawl 122 is provided to prevent backward movement of the ratchet wheel when the lever 120 is moved forward at successive intervals to rotate the shaft 110. By this arrangement any one of the plow beams may be raised individually while the remaining plows are maintained in operation. Any single plow that has been raised may again be dropped by pressing the foot lever 130, individual to each forward latch member 55, which has an end 131 adapted to bear against the said member and push it away from the notched end of the plow beam when depressed. At this time the pulley 111, utilized in raising the beam, should be released from the shaft by throwing out the corresponding clutch 117 allowing the pulley to roll free on the shaft during the dropping of the plow beam attached thereto.

In use the operator stands upon the platform 50 and most of the levers are within his immediate reach and control such as the steering wheel, foot levers 108 and 99, and the hand lever 120 and, while the hand levers 77 and 77ª are upon opposite sides of the machine they may be readily reached by the operator at the time necessary to operate one or the other of the said levers. All of the supporting wheels being propelling wheels, the entire weight of the machine is utilized in traction. The machine is also easily operated as the power plant is utilized in manipulating the plows and the entire strain imposed on the device through drawing the plows through the earth is applied directly on the heavy fixed cross-bar 62 so that all parts supporting the plow beams and connected levers, etc., are relieved of such strain and for this reason may be light in weight.

Having thus briefly described my invention, what I claim and desire to secure by Letters Patent of the United States is—

1. In a power operated plow, a self-propelled power apparatus provided with a main frame, a secondary frame-work carried above the main frame, a platform on said secondary frame, a series of releasable supports pivotally secured to both the front and rear of the secondary frame, a series of plows provided with plow beams having forward and rear ends adapted to be engaged by the supports individual thereto, a lever through operation of which the said front supports may be simultaneously disengaged to drop the forward ends of the plow beams, a draw-bar for each plow beam, adjustable means limiting the depth to which the plow may enter the ground, means for applying the power of the device to raise the plows out of the ground and the plow beams to engagement by the supports, and automatic means for releasing the plows and beams from actuation by the lifting means.

2. In a power operated plow, a self-propelled power apparatus provided with a main frame, a secondary frame-work carried above the main frame and provided with a platform, a series of plows provided with beams having notched forward and rear ends, a series of forward and rear spring controlled latch members each adapted to engage a notched end of the plow beam, a lever through operation of which the forward latch members may be simultaneously disengaged to drop the forward end of the plow beams whereby the plows may enter the ground point first, a draw beam pivotally attached to each plow beam by means of which it may be drawn through the ground, adjustable means for limiting the extent to which the plows may enter the ground, means for applying the power of the device to simultaneously raise the plows out of the ground and the plow beams to engagement by the supporting latch members, automatic means for releasing the plows from actuation by the lifting means and manual means for raising the plows singly.

3. In a power operated plow, a self-propelled power apparatus provided with a main frame, a secondary framework carried above the main frame provided with a platform, a series of plows provided with beams having notched forward and rear ends, a series of forward and rear spring controlled latch members each adapted to automatically engage a notched end of the plow beam, a lever through operation of which the said forward latch members may be simultaneously disengaged to drop the front ends of the plow beams whereby the plows may enter the ground point first, a draw beam pivotally attached to each plow beam by means of which it may be drawn through the ground by forward movement of the device, adjustable means for limiting the extent to which the plows may enter the ground, means for raising the plows out of the ground, means for applying the power of the apparatus to the raising means, and means individual to each plow beam for guiding the beam while the plow is being lowered into or raised out of the ground, said means being adapted to hold the plows from sidewise movement, automatic means for disengaging the power device from the raising means, said automatic means including an adjustable device whereby the power is not disengaged until the plow beams have been engaged by the supporting latch members.

4. In a power operated plow, a self-propelled power apparatus provided with a main frame, a secondary framework carried above the main frame at the rear thereof and provided with a platform, a series of plows carried in the secondary framework provided with beams having notched forward and rear ends, means for raising the plows, a series of forward and rear spring controlled latch members each adapted to automatically engage the notched ends of the plow beams, a lever through operation of which the forward latch members may be simultaneously disengaged from the plow beams, and a series of levers each individual to a forward latch member through operation of which a single latch member may be disengaged from the forward end of the corresponding plow beam, the operation of releasing the plow beams at the forward end allowing the plows to enter the ground point first.

5. In a power operated plow, a main frame, a single forward steering wheel and a pair of rear wheels supporting said frame, a power plant adapted to drive the said wheels, a secondary frame supported on the main frame above the rear wheels, a platform carried by said secondary frame, a series of plows provided with beams, a series of forward and rear releasable supports for said plow beams carried at the front and rear respectively of said secondary frame for holding the plows in inoperative position, means for releasing the plows from said supports to operative position, adjustable means for limiting the extent to which the plows may enter the ground, and means for raising the plows from the ground to engagement by the supports, said means comprising a pair of lifting beams positioned below the said plow beams near the front and rear ends thereof respectively, a cable attached to each end of each lifting beam, differential, segmental pulleys loose on the shaft of the rear wheels at each side of the device and so secured together as to operate in unison, the cables attached to the ends of the forward lifting beam being attached to and adapted to ride in the groove of the pulleys of lesser radius, and the cables attached to the ends of the rear lifting beam being attached to and adapted to ride in the groove of the pulleys of greater radius, the cables attached to the pulleys of greater radius being loose when out of operation and the cables attached to the pulleys of lesser radius being taut, and means for clutching the said pulleys to the driving wheels to raise the said beams attached to the cables and the plows and plow beams carried thereby, the taut cables attached to the pulleys of lesser radius enabling the front ends of the plow beams to be raised prior to the rear ends thereof, the pulleys of greater radius operating subsequent to the pulleys of shorter radius and adapted to raise the rear ends of the plow beams more rapidly than the front ends so that the said beams lie in a horizontal plane when raised to engagement by the supports, and automatic means for releasing the segmental pulleys from the driving wheels when the plow beams have been engaged by the supports.

6. In a power operated plow, a self-propelled power apparatus, a series of plows carried thereby provided with draft beams, releasable means for engaging the beams to support the plows in inoperative position, means for releasing the supports to drop the plows for insertion into the ground by the forward movement of the device, and means for applying the power of the apparatus to raise the plows point first out of the ground to bring the beams to engagement by the supports, said means involving a pair of differential segmental pulleys and cables attached thereto adapted to differentially raise the forward and rear ends of the plow beams when wound on the pulleys, the pulley of short radius being connected with the cables for raising the front ends of the plow beams whereby rotation of the said pulleys first winds the front cables and subsequently winds the rear cables on the pulley of greater radius whereby the front and rear ends of the plow beams are practically simultaneously brought to position to be engaged by the front and rear supports therefor, and automatic means for releasing said pulleys from actuation by the power apparatus.

7. In a power operated plow, a self-propelled power apparatus, a series of plows carried thereby provided with draft beams, a draw-bar for each draft beam, releasable means for supporting the plows in inoperative position, means for releasing the supports to drop the plows for insertion point first into the ground, means for guiding each of the draft beams while being lowered into or raised out of the ground, and means for applying the power of the apparatus to raise the plows point first out of the ground to engagement by the said supports, said means comprising a pair of segmental pulleys each having a grooved segment of short radius and a grooved segment of long radius, and cables attached to each of the said short and long segments adapted to raise the forward and rear ends respectively of the plow beams when wound on the said pulleys, the pulley of short radius being connected with the cables for raising the front ends of the plow beams, said cables being practically taut when the plows are in operation, and the cables of long radius being adapted to raise the rear ends of the plow beams and being slack when the plows are in operation, whereby rotation of the said pulleys first raises the front ends of the plow beams and subsequently raises the rear ends thereof more rapidly than the front ends whereby the said beams are brought substantially to horizontal position for engagement by the supports, a pair of clutches through operation of which the said pair of pulleys may be driven by the propelling wheels of the device, an operating device adapted to actuate the said clutches, and automatic means for releasing the said clutches when the draft beams have been brought to engagement by the supports.

8. In a power operated plow, a self-propelled power apparatus, a series of plows carried thereby provided with draft beams, a draw-bar for each draft beam, releasable means for supporting the forward and rear ends of the draft beams to hold the plows in inoperative position, means for simultaneously releasing the supports to drop the forward ends of the said beams and allow the plows to draw point first into the ground, adjustable means limiting the extent to which the plows may enter the ground, said means being capable of such adjustment as to allow the plow on one side or the other of the apparatus to plow deeper than the plow on the opposite side of the apparatus, and means for applying the power of the apparatus to raise the plows point first out of the ground to bring the beams into engagement practically simultaneously by the forward and rear supports, said means comprising a pair of segmental pulleys each having a grooved segment of short radius and a grooved segment of long radius, and cables attached to each of the said short and long radius segments adapted to raise the forward and rear ends of the draft beams when wound on the said pulleys, the pulleys of short radius being connected to the cables for raising the front ends of the plow beams, said cables being practically taut when the plows are in operation, and the pulleys of long radius being adapted to raise the rear ends of the plow beams, the attached cables being slack when the plows are in operation, whereby rotation of the said double radius pulleys first raise the front ends of the plow beams and subsequently raise the rear ends thereof more rapidly than the front ends to bring the said beams substantially to horizontal position for engagement simultaneously by the forward and rear supports, a pair of clutches through operation of which the said pair of pulleys may be driven by the propelling wheels of the device, an operating device adapted to actuate the said clutches, and automatic means for releasing the said clutches when the beams have been brought to engagement by the supports.

9. In a power operated plow, a self-propelled power apparatus including a frame work, a series of releasable supports pivotally secured to the front and rear of the frame work, a series of plows provided with beams adapted to be engaged at the forward and rear ends by the supports individual thereto, means for simultaneously disengaging the front supports to drop the forward ends of the plow beams, adjustable means limiting the depth to which the plows may enter the ground, means for applying the power of the device to raise the plows out of the ground and the plow beams to engagement by the supports, and automatic means for releasing the plows and beams from actuation by the lifting means.

10. In a power operated plow, a power plant, a series of plows provided with draft beams, means for releasing the plows for insertion into the ground by forward movement of the apparatus and means for applying the power of the apparatus to raise the plow point first out of the ground to inoperative position, said means involving a pair of differential segmental pulleys for each plow and cables attached thereto adapted to differentially raise the forward and rear ends of the plow beam when wound on the pulleys, the pulley of short radius being connected with the cable for raising the front end of the plow beam and the pulley of long radius being connected with the cable for raising the rear end of the plow beam, the rear cable being slack and the front cable being taut whereby rotation of the pulleys first winds the front cable and subsequently winds the rear cable and the front and rear ends of the plow beam are substantially simultaneously brought to inoperative position.

In testimony whereof, I sign this specification in the presence of two witnesses.

HOWARD M. SWEET.

Witnesses:
  RICHARD ALSPAS,
  CHARLES E. WISNER.